United States Patent [19]

Nicholas

[11] 4,283,834
[45] Aug. 18, 1981

[54] APPARATUS AND METHOD FOR ALIGNING FINE WIRE FOR THERMAL BONDING

[75] Inventor: Richard F. Nicholas, Whittier, Calif.

[73] Assignee: Rockwell International Corporation, El Segundo, Calif.

[21] Appl. No.: 21,404

[22] Filed: Mar. 19, 1979

[51] Int. Cl.³ .................. B23K 37/04; H01R 43/02
[52] U.S. Cl. ............................... 29/468; 29/860; 228/49 R
[58] Field of Search ............ 29/468, 464, 628, 747, 29/750, 760, 241, 271, 433, 860; 228/44.1 A, 49 R; 33/406

[56] References Cited

U.S. PATENT DOCUMENTS

| | | | |
|---|---|---|---|
| 2,952,915 | 9/1960 | Schrauder | 33/406 |
| 3,491,426 | 1/1970 | Grassauer | 29/749 |
| 4,017,013 | 4/1977 | Hawk et al. | 225/96.5 |

Primary Examiner—Milton S. Mehr
Attorney, Agent, or Firm—H. Fredrick Hamann; Wilfred G. Caldwell; Daniel R. McGlynn

[57] ABSTRACT

The invention is an apparatus and method for aligning a very fine wire relative to a workpiece. It comprises an alignment fixture supporting a pair of spaced-apart lead screws for receiving the wire in the threads thereof. The wire is affixed to spacer arms oppositely protruding from the fixture and spans the spacing between the screws. The workpiece is supported between the spacer arms and may be raised or lowered to provide alignment with the wire which is then translated or oriented by turning either or both of the lead screws until the relative alignment is achieved. The wire is affixed to each of the arms in a slackened condition and a tiny weight is suspended from the wire for yieldably tensioning the same across the threads, but providing for translation without fracture.

6 Claims, 3 Drawing Figures

# APPARATUS AND METHOD FOR ALIGNING FINE WIRE FOR THERMAL BONDING

The invention herein described was made in the course of or under a contract or subcontract thereunder with the Department of the Navy.

BACKGROUND OF THE INVENTION

1. Field of the Invention.

The invention relates to a unique alignment fixture and method for aligning very fine wire relative to a workpiece.

2. Prior Art.

U.S. Pat. No. 3,491,426 to Grassauer, issued Jan. 27, 1970, and entitled "Wire Holding Fixture" utilizes an advancing screw for permitting the sequential feeding of wires into a connector while securely clamping the previously-inserted wires. The screw has a feeding slot through which the wire is passed and the wires are sequentially inserted through the feed slot into solder sleeves with the screw being turned one revolution after each wire is inserted. Therefore, the wire is not handled by the screw threads but merely the threads are a measure for aligning the feed hole with the solder receiving sleeves once each revolution.

U.S. Pat. No. 3,949,790 to Rass, et al, entitled "Apparatus for Joining Two Coils of Wires" issued Apr. 13, 1976, discloses a structure for supporting two coils of wire with their ends in juxtaposition for joining. A pair of parallelly located ribbed gripping devices are employed to hold the ends. However, the wire does not appear to engage any threads of such devices nor are the devices in spaced-apart position for accommodating the workpiece therebetween, nor is there any solution to the problems of handling tiny wire.

No prior art known discloses any method or apparatus capable of or adapted for handling of tiny wires. Wire having a diameter of, for example, 0.0001 inches is normally invisible to the naked eye, and the human handling of such wire is practically impossible because of the unsteadiness of a person's hands. So, if it is impossible to see the wire, it is extremely difficult to observe the same through a microscope while holding it in one's hands without fracturing it. Thus, in summary, the prior art is totally unconcerned with the unique problems associated with the alignment of such fine wires.

SUMMARY OF THE INVENTION

The present invention relates to a unique method and apparatus for relatively positioning a fine wire and a workpiece wherein a pair of rotatable lead screws are disposed on a housing in spaced-apart positions and the wire is located across the lead screws and in the threads thereof. The wire is yieldably tensioned so that the threads engage the wire and movement of either or both lead screws by rotation thereof translates the wire relative to the workpiece which is located between the lead screws. Preferably, the workpiece is raised or lowered relative to the so-located wire, and translation of the lead screws provides for motion in the X and Y planes with Z plane motion being provided by adjustment of the workpiece.

BRIEF DESCRIPTION OF THE DRAWINGS

The invention will be better understood from a reading of the following detailed description thereof when taken in light of the accompanying drawings wherein.

DESCRIPTION OF A PREFERRED EMBODIMENT

Figure 1:
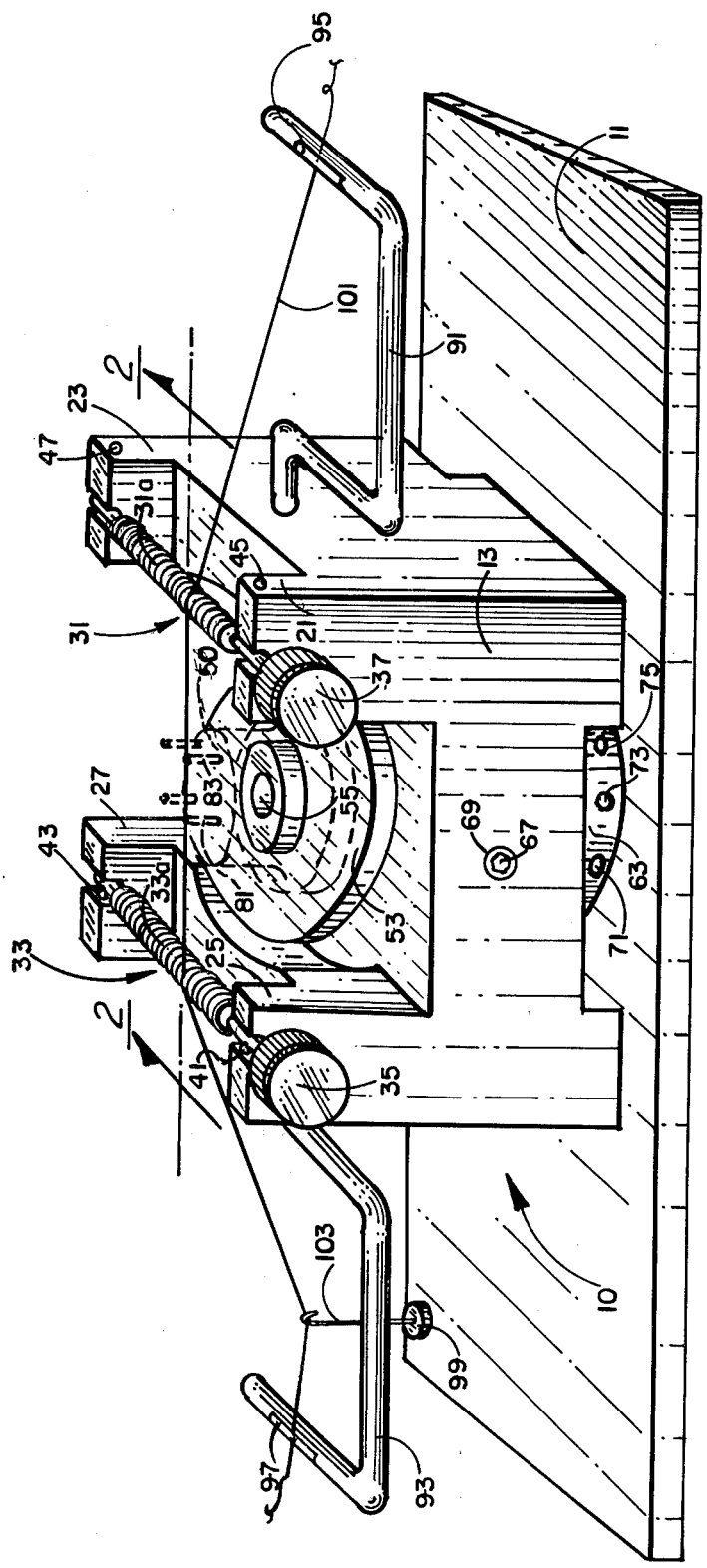
FIG. 1 is a view in perspective of the preferred form of the apparatus in accordance with the present invention showing the workpiece in dotted outline.
Figure 2:
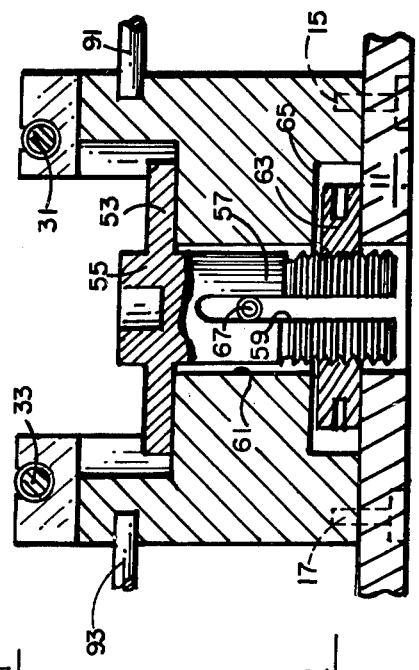
FIG. 2 is a cross sectional view of the fixture housing, showing the internal construction thereof; and, FIG. 3 is a partial plan view, taken from FIG. 1, on an enlarged scale, to show details of the structure with the wire now welded to two of the terminal posts of the workpiece.

Referring now to the drawings, and more particularly to FIG. 1, the fixture 10 of the present invention comprises a base 11 and a housing 13, the latter being affixed to the former by the screws 15 and 17 (FIG. 2). The material of the housing 13 and base 11 is preferably brass, to provide a heavy stationary fixture.

The housing 13 (FIG. 1) includes a pair of uprisers 21 and 23 on the right hand side thereof and a corresponding pair of uprisers 25 and 27 on the left hand side thereof. Each pair of uprisers includes aligned slots to accommodate, respectively the lead screws 31 and 33. The screws 31 and 33 have their threads relieved near their ribbed operating knobs 35 and 37, and also at the remote terminal ends, in order to fit within the slots in the uprisers 21, 23 and 25, 27 for rotational movement relative thereto. The preferred size for the screws in the example herein presented is 4–40.

The lead screws 31 and 33 are retained in their rotatable positions by virtue of tiny cone-shaped screws 41 and 43 visible in respect to threaded screw 33, which are inserted through corresponding holes, such as 45 and 47 shown in the uprisers 21 and 23.

The workpiece 50 is adapted to be supported in the space between the threaded screws 31 and 33. It is carried on a mounting face plate 53 which has a positioning flange 55, both of which are integral with threaded shaft 57 which is slotted at 59 along a central vertical portion thereof. The threaded portion 57 is contained within bore 61 and portion 57 is free to slide vertically therein except for the confined nut 63 which threadably engages threaded portion 57. The nut 63 is confined between the base 11 and a cutaway portion having an upper wall 65 (FIG. 2) in housing 13. Since the nut is confined, any turning of the nut must necessarily result in vertical motion of the threaded portion 57, and consequently, the mounting face plate 53. This is true because threaded portion 57 is prevented from turning by virtue of a slot 57 which receives a screw or bolt having an allen wrench head 67 visible in the penetrating hole 69 of housing 13 (FIG. 1).

Also in FIG. 1, it will be seen that the periphery of the nut 63 includes spaced-apart openings 71, 73, 75, etc., which receive an elongated rod, or the like, for turning the nut 63 to raise and lower plate 53.

While the workpiece may comprise many configurations, for purposes of explanation, a ceramic electric terminal is shown as workpiece 50. It snugly fits the adapter flange 55 in order to hold it in position platform 53, and it consequently is raised and lowered by turning nut 63. Workpiece terminal 50 includes four terminal posts such as 81 and 83—also seen in the enlarged fragmentary portion view of FIG. 3. The alignment requirement is that wire 101 be aligned with the upper ends of terminal posts 81 and 83 to permit it to be welded thereto, as represented by the solder droplets 85 and 87.

In order to maintain the wire 101 tautly across the threads 31a and 33a, and yet permit orientation or translation thereof relative to the terminal posts 81 and 83 without fracture, a supporting arrangement is provided in the form of the oppositely extending arms 91 and 93 of housing 13. The wire 101 is taped to arm 91 by tape 95, and is passed across the spacing between the lead screws 31 and 33, and then is taped to arm 93 by tape 97. In order to take up the intentional slack, a tiny weight 99 is suspended from the wire 101 by hook 103. When tungsten wire having a diameter of 0.0001 of an inch is employed, it has been found that a weight of 0.173 grams for the weighting structure including weight 99 and hook 103 is operable, to retain the tautness while permitting yieldability to accommodate the lengthening or shortening movement of the portion of the wire 101 between the lead screws 31 and 33 during adjustment.

Figure 3:
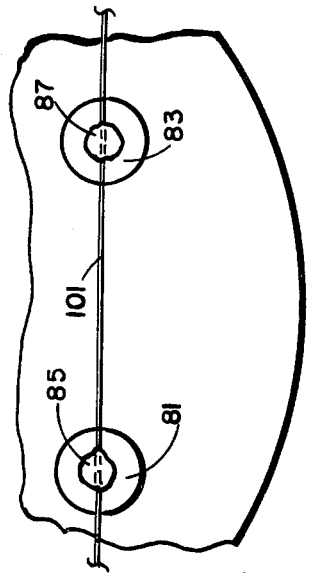

It is usually necessary to view te alignment procedure to accomplish the same through a microscope while operating knobs 35 and 37 to position wire 101 across the midpoints of terminal posts 81 and 83, as shown in FIG. 3.

The foregoing description is intended to be illustrative only, and not to limitative, but rather the scope of the invention is defined by the claims appended hereto.

What is claimed is:

1. An alignment fixture for relatively positioning a fine wire and a workpiece comprising, in combination:
   a base;
   a housing supported by the base;
   a pair of spaced apart lead screws independently rotatably supported by the housing;
   a first spacer arm extending outwardly of the housing in a direction away from one of said screws;
   a second spacer arm extending outwardly of the housing in a direction away from the other of said screws; and,
   means for supporting the workpiece between said spacer arms;
   said wire extending from one of the spacer arms to the other of the spacer arms via the threads of said screws whereby rotation of one or both of the screws translates the wire relative to the workpiece.

2. The fixture of claim 1, further comprising:
   means carried by the housing for raising and lowering the means for supporting the workpiece whereby relative translation motion between the wire and the workpiece is available in the X, Y and Z planes.

3. The fixture of claim 2, further comprising:
   means affixing the wire to each of said arms in a slackened condition, and,
   means for yieldably tensioning the wire to permit translation thereof without fracture.

4. The fixture of claim 3 wherein:
   said last mentioned means comprises a weight of approximately 0.173 grams when said wire has a diameter of approximately 0.0001 inches.

5. The method of positioning a fine wire of diameter of the order of 0.0001 inches relative to a workpiece comprising the steps of:
   disposing a pair of rotatable lead screws in spaced apart positions on a housing;
   disposing a workpiece between said lead screws;
   locating the wire spanning at least the distance between the lead screws and extending thereacross directly in contact with the threads thereof;
   yieldably tensioning the so-located wire; and
   translating the wire relative to the workpiece by rotating either or both of the lead screws.

6. The method of claim 5, further comprising:
   raising and lowering the workpiece relative to the wire to provide for X, Y and Z plane relative translation between the wire and workpiece.

* * * * *